UNITED STATES PATENT OFFICE.

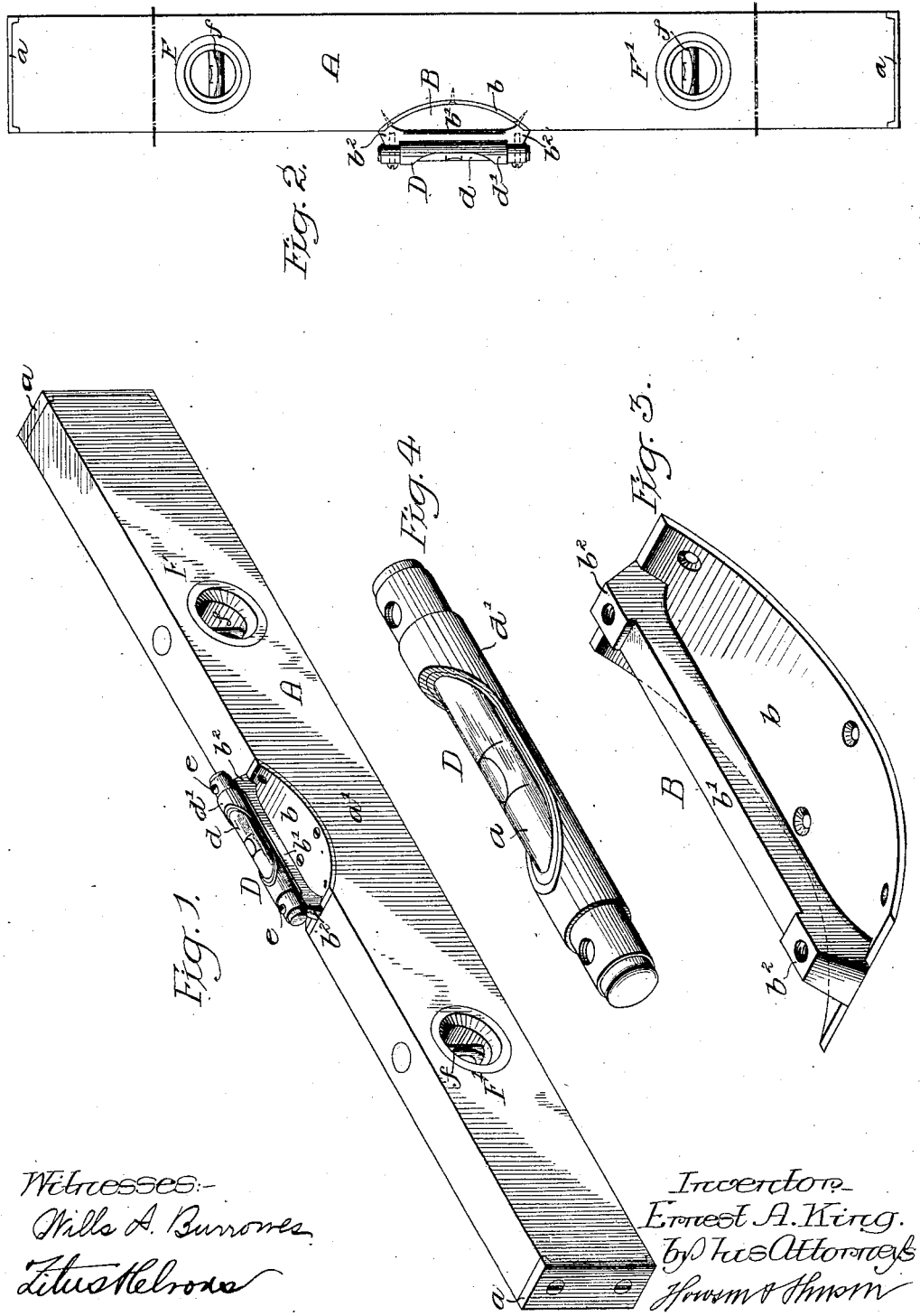

ERNEST A. KING, OF PHILADELPHIA, PENNSYLVANIA, ASSIGNOR TO HENRY DISSTON & SONS INCORPORATED, OF PHILADELPHIA, PENNSYLVANIA, A CORPORATION OF PENNSYLVANIA.

LEVEL.

No. 876,720.

Specification of Letters Patent.

Patented Jan. 14, 1908.

Application filed August 31, 1907. Serial No. 390,945.

*To all whom it may concern:*

Be it known that I, ERNEST A. KING, a citizen of the United States, residing in Philadelphia, Pennsylvania, have invented certain Improvements in Levels, of which the following is a specification.

My invention relates to certain improvements in levels used by mill-wrights, carpenters, masons, etc.

The object of my invention is to provide a handhold which can be readily grasped when the level is used; and a further object is to provide means whereby the level can be readily sighted whether the level is held above or below the normal line of vision.

In the accompanying drawing:—Figure 1, is a perspective view of my improved level; Fig. 2, is a side view; Fig. 3, is a perspective view of the handhold detached; and Fig. 4, is a detached perspective view of the horizontal level glass.

A is the body of the level of the ordinary size having metallic end plates $a$, $a$ in the present instance. The body portion of the level is preferably made of wood and is recessed at $a'$ to form a pocket for the reception of the handle B; the plate $b$ of the handle in the present instance being curved to fit the recess $a'$ and the grip section $b'$ extends from one edge of the plate to the other, there being a sufficient distance between the grip and the plate for the reception of the fingers of the hand. The handle is held in place by screws or other suitable fastenings.

D is a casing containing the glass $d$ of the horizontal section of the level. This casing is cut away to expose the glass and $d'$ is a sleeve fitting over the section D which is also cut away so that on turning this sleeve the glass can be either exposed or covered as desired. The section D is held to the grip portion of the handle by screws $e$, $e$ which pass through the ends of the section D and into threaded openings $b^2$ in raised portions of the handle, as clearly shown in Fig. 3. By adjusting these screws the section D can be set plumb in respect to the level.

As shown in the drawings the level has two sights F, F' each having a glass $f$ therein for use in plumbing in a vertical line. Both the glasses in these sights are preferably partially inclosed in casings and arranged with their exposed surfaces facing the same direction, one being used when the level is raised above the head and the other being used when the level is lowered to a position below the normal sight. By this arrangement the instrument can be used for a greater height of wall or other object being leveled than would be the case where a single sight was used. If, for instance, the level is used above the head it can be extended to such a distance that the upper glass will be out of sight and the lower glass exposed sufficiently that the bubble can be readily seen. The same is the case when the instrument is used below the normal sight line.

By the use of the handle as illustrated the instrument can be firmly grasped by the hand and held rigidly in position and conveniently carried. Furthermore the hand protects the horizontal section of the level when carried or used in any position, except the horizontal.

I claim:—

1. The combination in a level, of a body portion having a recess in one edge, a handle section mounted in the recess, and a horizontal level section carried by the handle section, substantially as described.

2. The combination of a body portion having a curved recess in one edge, a handle consisting of a handhold and a curved plate, said plate being curved on the same line as the recess in the body portion, and a horizontal level section mounted on the handhold of the handle section, substantially as described.

3. The combination in a level, of a body portion, a handle section secured to one edge of the body portion, a horizontal level section carried by the handhold of the handle section, and two sights one near one end of the body portion the other near the other end, and partially inclosed glasses in the sights both facing the same way, substantially as described.

In testimony whereof, I have signed my name to this specification, in the presence of two subscribing witnesses.

ERNEST A. KING.

Witnesses:
WM. MILLER,
W. C. BURKHOLDER.